United States Patent
Wang

(10) Patent No.: US 8,922,526 B2
(45) Date of Patent: Dec. 30, 2014

(54) TOUCH DETECTION APPARATUS AND TOUCH POINT DETECTION METHOD

(75) Inventor: Karl-Lin Wang, Taipei (TW)

(73) Assignee: Silicon Motion, Inc., Jhubei, Hsinchu County (TW)

(*) Notice: Subject to any disclaimer, the term of this patent is extended or adjusted under 35 U.S.C. 154(b) by 916 days.

(21) Appl. No.: 12/693,484

(22) Filed: Jan. 26, 2010

(65) Prior Publication Data
US 2011/0084938 A1    Apr. 14, 2011

(30) Foreign Application Priority Data
Oct. 8, 2009   (TW) .............................. 98134082 A

(51) Int. Cl.
G06F 3/042    (2006.01)

(52) U.S. Cl.
CPC .................................... *G06F 3/0428* (2013.01)
USPC ........................................................ 345/175

(58) Field of Classification Search
CPC ...... G06F 3/041; G06F 3/0425; G06F 3/0428
USPC .................................. 345/173, 175–176, 178
See application file for complete search history.

(56) References Cited

U.S. PATENT DOCUMENTS

| 4,746,770 | A | * | 5/1988 | McAvinney | ............... | 178/18.09 |
| 5,317,140 | A | * | 5/1994 | Dunthorn | ...................... | 250/221 |
| 6,828,959 | B2 | * | 12/2004 | Takekawa et al. | ............ | 345/173 |
| 7,355,593 | B2 | * | 4/2008 | Hill et al. | ...................... | 345/173 |
| 2011/0006981 | A1 | * | 1/2011 | Chtchetinine et al. | ........ | 345/157 |

* cited by examiner

*Primary Examiner* — Jonathan Horner
(74) *Attorney, Agent, or Firm* — McClure, Qualey & Rodack, LLP

(57) ABSTRACT

A touch detection apparatus is provided, in which a touch panel is implemented with four surrounding edges. Three of the edges are embedded with retro-reflection materials. Light sources and pinholes are deployed on both corners of the touch panel, allowing reflections from the three edges to be projected on light sensors through the pinhole. The images projected on the light sensors are analyzed to determine coordinates of one or more contact points on the touch panel.

20 Claims, 6 Drawing Sheets

TOUCH DETECTION APPARATUS AND TOUCH POINT DETECTION METHOD

CROSS REFERENCE TO RELATED APPLICATIONS

This application claims priority of Taiwan Patent Application No. 098134082, filed on Oct. 8, 2009, the entirety of which is incorporated by reference herein.

BACKGROUND OF THE INVENTION

1. Field of the Invention

The disclosed embodiments relate to a touch screen, and more particularly to an apparatus and methods for sensing touch points by collecting reflection lights via a pinhole structure.

2. Description of the Related Art

Touch interfaces are broadly used in various electronic devices, such as handheld mobile apparatus or display panels. In current technologies, locations of points of contact are detected by using a resistive or capacitive sensor array, which may be stacked on an operation interface for detecting the contact points. However, as far as large display panels as concerned, the fabrication of sensor arrays has a high cost. In addition, some traditional touch interfaces adapt image sensing methods using photography equipment to determine whether the surface of a touch interface is touched. However, photography equipment requires light sensor components and lens costs. Moreover, in a multi-point touch situation, several sets of light sensor components and lenses must be installed and operated simultaneously to distinguishing the location of each contact point. Therefore, manufacturing cost for traditional touch detection is prohibitively expensive.

BRIEF SUMMARY OF THE INVENTION

The invention provides a touch detection apparatus for detecting locations of touch points without using high cost photography equipment. An embodiment of a touch detection apparatus includes a touch panel encircled by four edges, wherein a first edge, a second edge and a third edge are embedded with retro-reflection materials. Light sources and pinholes are deployed on both corners of the touch panel according to an embodiment of the invention. Light sensors are disposed at outer edges of the touch panel and behind the pinholes for receiving images projected through the pinholes. The retro-reflection materials at the first edge, the second edge and the third edge are used to reflect the light from the light sources to the pinholes, so as to form images being projected on the light sensors. The coordinates of touch points on the touch panel are determined according to obstructed locations on the images.

A first light source and a first pinhole are disposed on the corner of the first edge and the fourth edge. The first light source emits a first light beam toward the second edge and the third edge to generate a first reflection light. In addition, a second light source and a second pinhole are disposed on the corner of the second edge and the fourth edge. The second light source emits a second light beam toward the first edge and the third edge to generate a second reflection light. A first light sensor module is disposed at the outer edge of the touch panel and separated from the first pinhole by a predetermined distance for detecting a first image projected on the first light sensor module by the first reflection light through the first pinhole. A second light sensor is disposed at the outer edge of the touch panel and separated from the second pinhole by the predetermined distance for detecting a second image projected on the second light sensor module by the second reflection light through the second pinhole. The first image and the second image are transmitted to a processor upon being received by the first light sensor module and the second light sensor module.

The processor performs an image analysis process according to the first image and the second image when the at least one object contacts the touch panel, so as to determine a coordinate of the touch point where the touch panel is contacted by at least one object.

Further, an embodiment of a touch point detection method is implemented based on the aforementioned touch detection apparatus. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
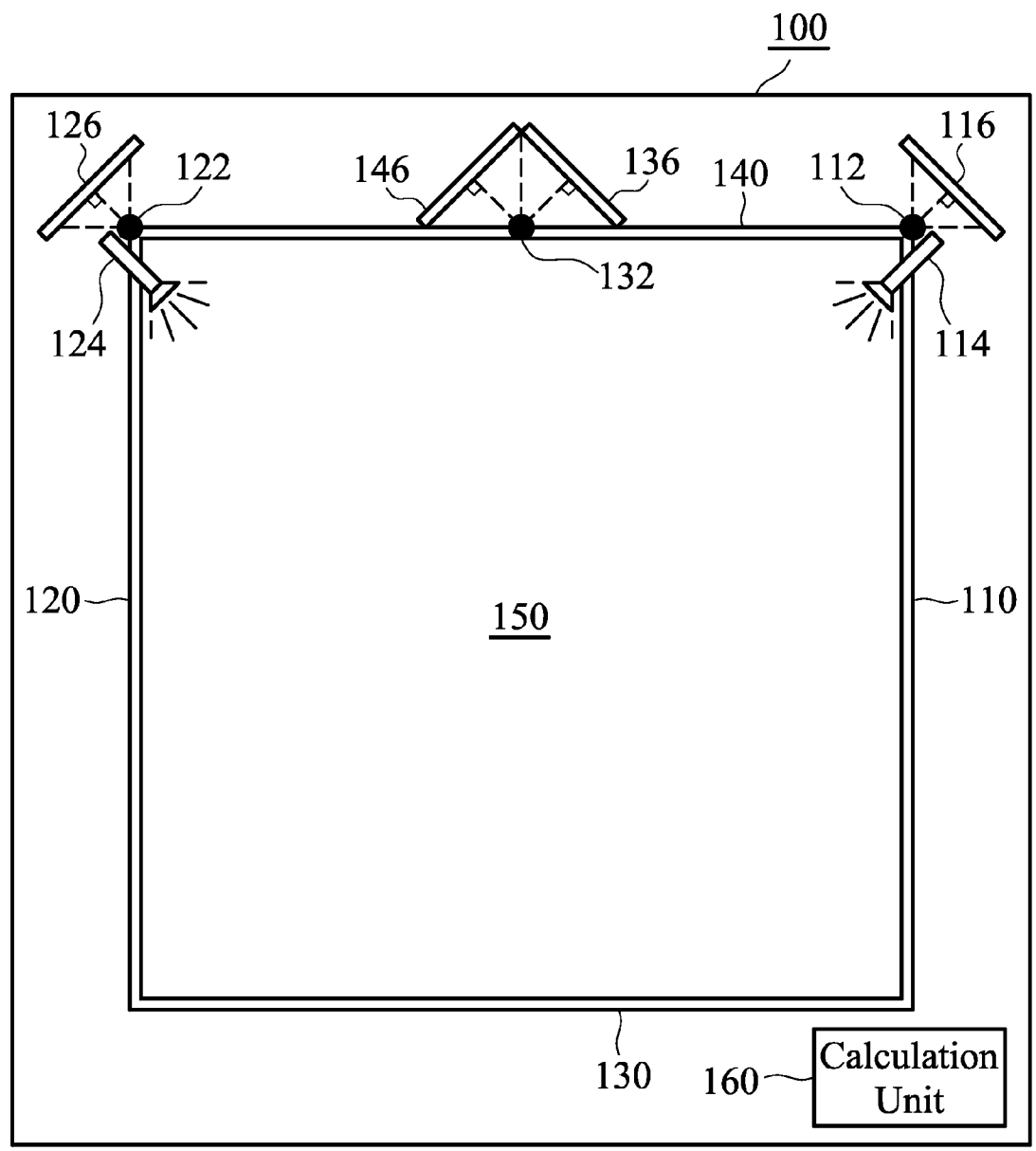
FIG. 1 is a block diagram illustrating a touch detection apparatus according to an embodiment of the invention.

Compared to conventional touch detection techniques, an embodiment of the invention adapts a pinhole projection method for generating images, so as to reduce costs associated with lenses and photography equipment. Additionally, the arrangement of touch detection is also particularly arranged to facilitate the multi-point touch detection. FIG. 1 is a block diagram illustrating a touch detection apparatus 100 according to an embodiment of the invention. The touch detection apparatus 100 comprises a touch panel 150 as an interface for receiving contact. The touch panel 150 is encircled by a first edge 110, a second edge 120, a third edge 130 and a fourth edge 140. For description, the first edge 110 and the second edge 120 are respectively disposed on the right side and the left side of the touch panel 150, as well as the third edge 130 and the fourth edge 140 is respectively disposed on the bottom side and the top side of the touch panel 150.

Retro-reflection materials are disposed on the first, second, and third edges for reflecting an incoming light with any incident angles along with the original incident path.

The usage of retro-reflection materials may be implemented by accompanying various broadly existing technologies. Thus, detailed description is omitted for simplicity. A first pinhole 112 and a first light source 114 are disposed on the top right corner of the touch panel 150, i.e., the cross corner of the first edge 110 and the fourth edge 140. A first light beam emitted from the first light source 114 may have a field of view (FOV) of 90 degrees, including the entire ranges of the second edge 120 and the third edge 130. The first pinhole 112 may collect a first reflection light reflected from the second edge 120 and the third edge 130. A first light sensor module 116 is disposed at the outer edge of the touch panel 150 and separated from the first pinhole 112 by a predetermined distance. The first reflection light may be projected on the first light sensor module 116 through the first pinhole 112 to form a first image. Generally, if no obstruction exists among the first light source 114, the second edge 120 and the third edge 130, the first image represents the reflections from the second edge 120 and the third edge 130.

Similarly, a second pinhole 122 and a second light source 124 are disposed on the top left corner of the touch panel 150, i.e., the cross corner of the second edge 120 and the fourth edge 140. A second light beam emitted from the second light source 124 may have a field of view (FOV) of 90 degrees, including the entire ranges of the first edge 110 and the third edge 130. A second reflection light reflected from the first edge 110 and the third edge 130 may be collected by the second pinhole 122. A second light sensor module 126 is disposed at the outer edge of the touch panel and separated from the second pinhole 122 by the predetermined distance for detecting a second image projected on the second light sensor module 126 by the second reflection light through the second pinhole 122.

Specifically, when objects approach or contact the surface of the touch panel 150 on any locations, hue, brightness or texture variation may appear on the corresponding locations of the first image on the first light sensor module 116 and the second image on the second light sensor module 126. For example, the first light source 114 and the second light source 124 may be specific light sources or light emitting diodes (LEDs) for generating specific beams, such as laser beams, infrared rays, or luminescence, and the first light sensor module 116 and the second light sensor module 126 are the corresponding receivers. Further, according to this embodiment, a visible ray may also be used as a light source, and the invention is not limited thereto.

In an embodiment of the invention, locations of touch points are determined by detecting the variation. In the touch detection apparatus 100, a calculation unit 160 is coupled to the first light sensor module 116 and the second light sensor module 126 for receiving the first image and the second image, so as to perform image analyses. When at least one object contacts the touch panel 150, the calculation unit 160 determines coordinates of touch points where the touch panel 150 is contacted by the at least one object according to the first image and the second image. The detailed description of determination will be given below.

Figure 2:
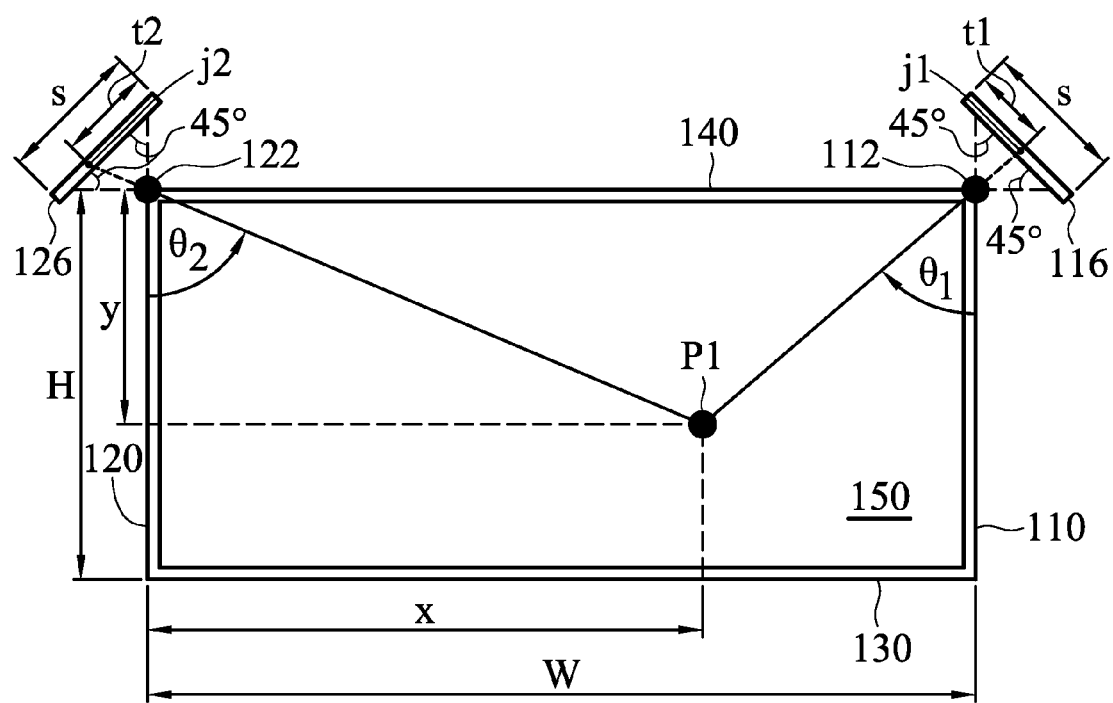
FIG. 2 illustrates an embodiment of detecting a touch point according to the invention.

FIG. 2 illustrates an embodiment of detecting a touch point P1 according to the invention. For brevity of description, in FIG. 2, the touch panel 150 as shown in FIG. 1 is simplified for illustrating light paths. In the embodiment of the invention, the first light sensor module 116 and the second light sensor module 126 may have the same length S for calculation purpose. The first sensor module 116 is diagonal to the fourth edge 140 by an angle of 45 degrees. The perpendicular bisector of the first light sensor module 116 is towards the first pinhole 112, thus making both terminals of the first light sensor module 116 and the first pinhole 112 form an isosceles triangle. As a result, projected light beams from any locations of the touch panel 150 may be entirely received through the first pinhole 112, especially the reflection light from the second edge 120 and the third edge 130. Similarly, both terminals of the second light sensor module 126 and the second pinhole 122 also form an isosceles triangle for receiving the reflection light from the first edge 110 and the third edge 130.

When an object, such as a finger or a touch pen, contacts the touch panel 150 on a first touch point P1, the reflection light from the second edge 120 and the third edge 130 are obstructed and unable to reach the first pinhole 112, such that an obstructed point j1 is projected on a location t1 of the first light sensor module 116. Similarly, the first touch point P1 is projected as an obstructed point j2 on a location t2 of the second light sensor module 126 through the second pinhole 122. Since the touch panel 150 is a flat plane, the first light sensor module 116 and the second light sensor module 126 are only required to detect one-dimensional line images for determining the location of the first touch point P1. Thus, the first light sensor module 116 and the second light sensor module 126 may be characterized by a specific line (i.e., one-dimensional) structure, instead of a pixel array with a large area. In this situation, only the variation of the specific light sources, such as gray levels, is required to be detected without fine hue gradation. Therefore, the cost is substantially lower than the conventional light sensor components. For example, the first image of the first light sensor module 116 and the second image of the second image of the second light sensor module 126 are displayed as line images with specific colors.

As shown in FIG. 2, the length of the first edge 110 and the second edge 120 equals the height of the touch panel 150, indicated as H, as well as the length of the third edge 130 The fourth edge 140 also equals to the width of the touch panel 150, indicated as W. According to an embodiment of the invention. the calculation unit 160 in FIG. 1 performs an image analysis process including two steps of an angle conversion operation and a coordinate conversion operation for calculating a coordinate (x, y) of the first touch point P1. As shown in FIG. 2, the angle formed between a direction from the first touch point P1 to the first pinhole 112 and the first edge 110 is defined as $\theta_1$, and the angle formed between a direction from the first touch point P1 to the second pinhole 122 and the second edge 120 is defined as $\theta_2$.

Upon detecting the obstructed points j1 and j2 on the first light sensor module 116 and the second light sensor module 126, the calculation unit 160 performs the angle conversion operation according to the following formula:

$$\tan\theta = \frac{t/s}{1-t/s}, \quad (1)$$

wherein $\theta$ represents the angle formed between the direction from the pinhole to the obstructed point projected on the light sensor component and the vertical axis (such as the first edge 110 and the second edge 120), t represents the obstructed location of the obstructed point projected on the light sensor component, and S represents the length of the light sensor component. For example, it is assumed that the length of the first light sensor module 116 and the second light sensor module 126 are S, then the angles $\theta_1$ and $\theta_2$ as shown in FIG. 2 may be obtained by replacing the obstructed locations of j1 and j2 into Formula (1):

$$\tan\theta_1 = \frac{t_1/s}{1-t_1/s} \quad (2)$$

and $$\tan\theta_2 = \frac{t_2/s}{1-t_2/s}. \quad (3)$$

The aforementioned Formula (2) and Formula (3) are derived according to the arrangement for disposing the first light sensor module 116 and the second light sensor module 126 diagonal to the fourth edge 140 by the angle of 45 degrees. When the first light sensor module 116 and the second light sensor module 126 are arranged with different angles, the corresponding formula also differs. Specifically, the coordinate of each point on the touch panel 150 may have a one-to-one mapping on the first light sensor module 116 and the second light sensor module 126 through the first pinhole 112 and the second pinhole 122. As a result, the coordinate (x, y) may be derived according to j1 and j2 with appropriate conversion formulas.

More specifically, according to embodiment of FIG. 2, since the first touch point P1 locates at the intersection of two lines extended by the first pinhole 112 and the second pinhole 122, the calculation unit 160 may further perform a conversion operation based on the obtained angles $\theta_1$ and $\theta_2$ and height H and width W of the touch panel 150. The coordinate of the first touch point P1 is accordingly obtained by use of simultaneous equations of trigonometric function. In this embodiment, omitting the derivation, the formula used for the conversion operation is indicated below:

$$x = \frac{W \tan\theta_2}{(\tan\theta_1 + \tan\theta_2)} \quad (4)$$

and $$y = H - \frac{W}{(\tan\theta_1 + \tan\theta_2)}. \quad (5)$$

From Formula (4) and Formula (5), the coordinate of the first touch point P1 is obtained by deriving the solution of the simultaneous equations involving two intersecting line segments respectively with the two angles $\theta_1$ and $\theta_2$, and height and width of the touch panel 150. The actual equations may differ from various locations of pinholes and various height and width of the touch panel 150. Therefore, the embodiment of the invention is not limited to detailed calculation in Formula (4) and Formula (5). For brevity of the following description, the conversion function is generally denoted as:

$$P(x,y) = F(\Theta_a, \Theta_b) \quad (6),$$

wherein P(x, y) represents the coordinate of each point P, and $F(\Theta_a, \Theta_b)$ represents the calculation process of Formula (4) and Formula (5), i.e., the intersection associated with angles $\Theta_a$ and $\Theta_b$ is designated as a corresponding coordinate (x, y). For example, by inputting angles $\Theta_a$ and $\Theta_b$ into Formula (6), the coordinate of the first touch point P1 is obtained as below:

$$P1(x,y) = F(\theta_1, \theta_2) \quad (7).$$

Figure 3:
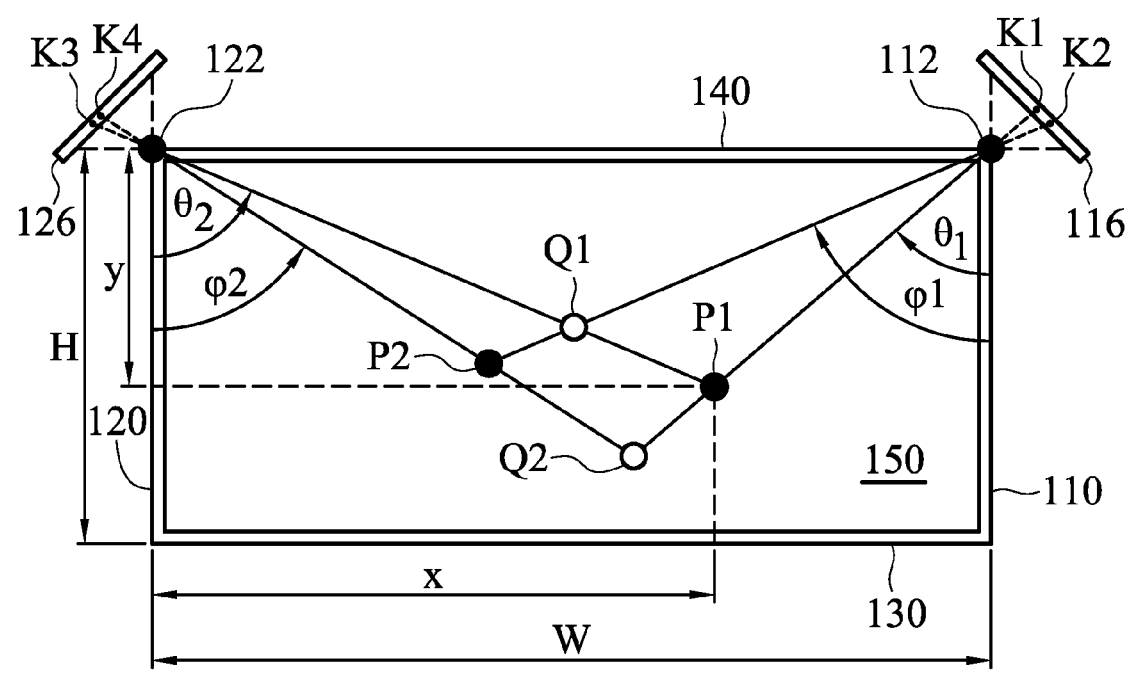
FIG. 3 illustrates an embodiment of simultaneously detecting two touch points according to the invention.

Further, the invention may be applicable to multipoint situations. FIG. 3 illustrates an embodiment of simultaneously detecting a first touch point P1 and a second touch point P2 according to the invention. As the first reflection light of the second edge 120 and the third edge 130 is obstructed by the two touch points P1 and P2 on the touch panel 150, two obstructed points K1 and K2 are generated on the first light sensor module 116. Similarly, two obstructed points K3 and K4 are generated on the second light sensor module 126. The obstructed locations of K1, K2, K3, and K4 are respectively replaced in Formula (1) to obtain two angles $\theta_1$ and $\theta_2$ corresponding to the first pinhole 112, as well as two angles $\phi_1$ and $\phi_2$ corresponding to the second pinhole 122. Specifically, four lines respectively extending from the first pinhole 112 and the second pinhole 122 with angles $\theta_1$, $\theta_2$, $\phi_1$ and $\phi_2$ may generate four intersections P1, P2, Q1, and Q2 on the touch panel 150 to derive the two touch points P1 and P2. According to Formula (6), the coordinates of the four intersections are represented as:

$$P1(x,y) = F(\theta_1, \theta_2) \quad (8),$$

$$P2(x,y) = F(\phi_1, \phi_2) \quad (9),$$

$$Q1(x,y) = F(\theta_2, \phi_1) \quad (10),$$

and $$Q2(x,y) = F(\theta_1, \phi_2) \quad (11),$$

That is, two sets of possible solutions (P1, P2) and (Q1, Q2) may be generated by the calculation unit 160. It is assumed that the first touch point is P1, and then the second touch point is determined to be P2. Moreover, it is assumed that the first touch point is Q1, and then the second touch point is determined to be Q2. Note that P1, P2, Q1 and Q2 are four coordinate candidates of the touch points since the actual solution is unable to be determined only by use of the four obstructed points K1, K2, K3 and K4. For deriving the actual solution, the invention further provides the following method.

Figure 4A:
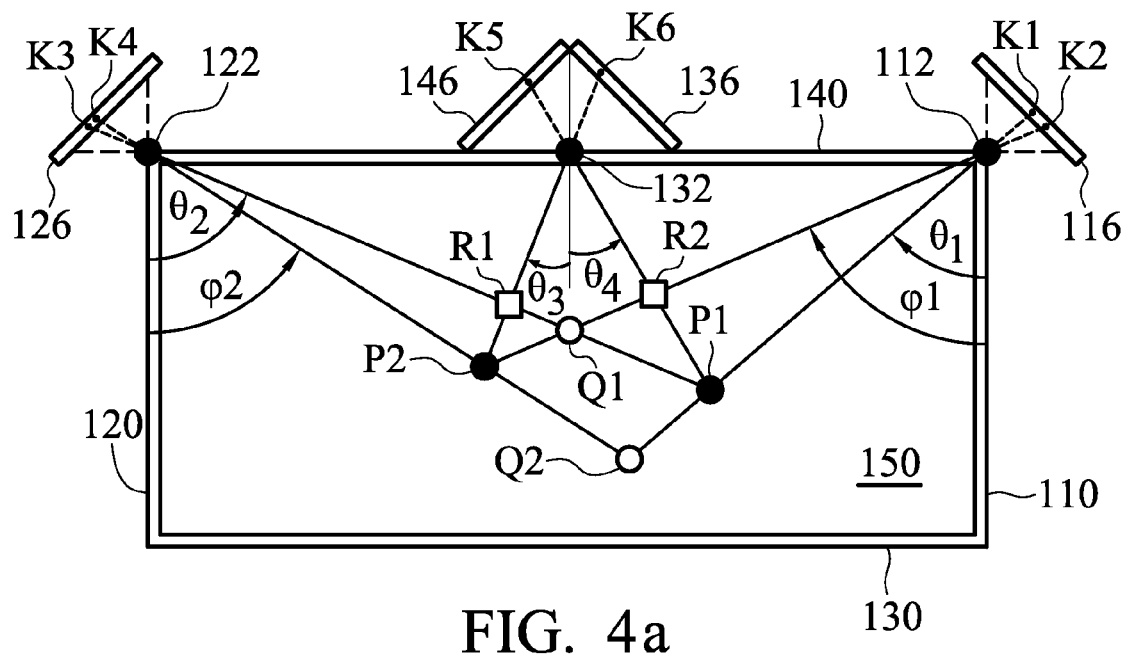
FIGS. 4a and 4b are two diagrams illustrating an embodiment of simultaneously detecting two touch points according to the invention.

FIG. 4a is a diagram illustrating another embodiment of simultaneously detecting a first touch point P1 and a second touch point P2 according to the invention.

A third pinhole 132 is additionally disposed on the middle of the fourth edge 140 for capturing an additional image, so as to facilitate the first pinhole 112 and the second pinhole 122 to determine the correct solution of multipoint touch. The third pinhole 32 has a field of view of 180 degrees, and a left light sensor 136 and a right light sensor 146 are disposed at the outer edge of the fourth edge 140. The left light sensor 136 and the right light sensor 146 have the same length and are disposed perpendicularly to each other, thus forming an isosceles triangle. The perpendicular bisectors of the left light sensor 136 and the right light sensor 146 are towards the third pinhole 132. Accordingly, a field of view of 180 degrees is completely captured through the third pinhole 132, i.e., reflection lights of the first edge 110, the second edge 120 and the third edge 130 are collected and projected through the third pinhole 132. Specifically, the left half portion of the touch panel 150 is within the field of view of the left light sensor 136 and the right half portion of the touch panel 150 is within the field of view of the right light sensor 146. Thus, obstruction from a touch point at any location on the touch panel 150 can be detected through the third pinhole 132. The arrangement of the light sensor modules is provided by disposing the left light sensor 136 and the right light sensor 146 perpendicularly to each other, however, other arrangements may be applicable for capturing 180-degree field of view, such as disposing a half-circle arc-shaped light sensor component centered at the third pinhole 132. The invention is not limited thereto.

In this embodiment of FIG. 4a, assuming that two objects simultaneously touch the touch panel 150 on two touch points P1 and P2, the obstructed points K1 and K2 are projected on the first light sensor module 116 and the obstructed points K3 and K4 are projected on the second light sensor module 126. In addition, the first touch point P1 located on the right half portion of the touch panel 150 is within the field of view of the right light sensor 146, thus forming the obstructed point K5 on the right light sensor 146. Also, the second touch point P2 located on the left half portion of the touch panel 150 forms the obstructed point K6 on the left light sensor 136. Upon detection by the left light sensor 136 and the right light sensor 146, the calculation unit 160 obtains the angles $\theta_1$, $\theta_2$, $\phi_1$, and $\phi_2$ respectively according to the obstructed points K1 and K2 on the first light sensor module 116 and the obstructed points K3 and K4 on the second light sensor module 126. Then, two sets of possible solutions (P1, P2) and (Q1, Q2) are obtained based on Formula (8), (9), (10), and (11). Additionally, the obstructed point K6 detected by the left light sensor 136 is replaced in Formula (1) to obtain an angle $\theta_3$. The line extended from the third pinhole 132 with respect to the angle $\theta_3$ intersects the two lines extended from the second pinhole 122 with respect to the angles $\theta_2$ and $\phi_2$ at two points R1 and P2, and the coordinates thereof are derived according to Formula (6):

$$R1(x,y)=F(\theta_3,\theta_2) \qquad (12)$$

and $$P2(x,y)=F(\theta_3,\phi_2) \qquad (13).$$

Furthermore, the obstructed point K5 detected by the right light sensor 146 is replaced in Formula (1) to obtain an angle $\theta_4$. The line extended from the third pinhole 132 with respect to the angle $\theta_4$ intersects the two lines extended from the first pinhole 112 with respect to $\theta_1$ and $\phi_1$ at two points R2 and P1, and the coordinates thereof are derived according to Formula (6):

$$R2(x,y)=F(\theta_4,\phi_1) \qquad (14)$$

and $$P1(x,y)=F(\theta_1,\theta_4) \qquad (15).$$

Based on four solutions of Formula (12) to Formula (15), only two points R1 and P2 are determined according to the obstructed point K6 on the left light sensor 136 and the obstructed points K3 and K4 on the second light sensor module 126, and only two points R2 and P1 are determined according to the obstructed point K5 on the right light sensor 146 and the obstructed points K1 and K2 on the first light sensor module 116. Comparing Formula (12), (13), (14), (15) with the former Formula (8), (9), (10), (11), it is determined that (P1, P2) is the intersection of the two sets of possible solution. As such, (P1, P2) is determined to be the actual locations of touch points.

Figure 4B:
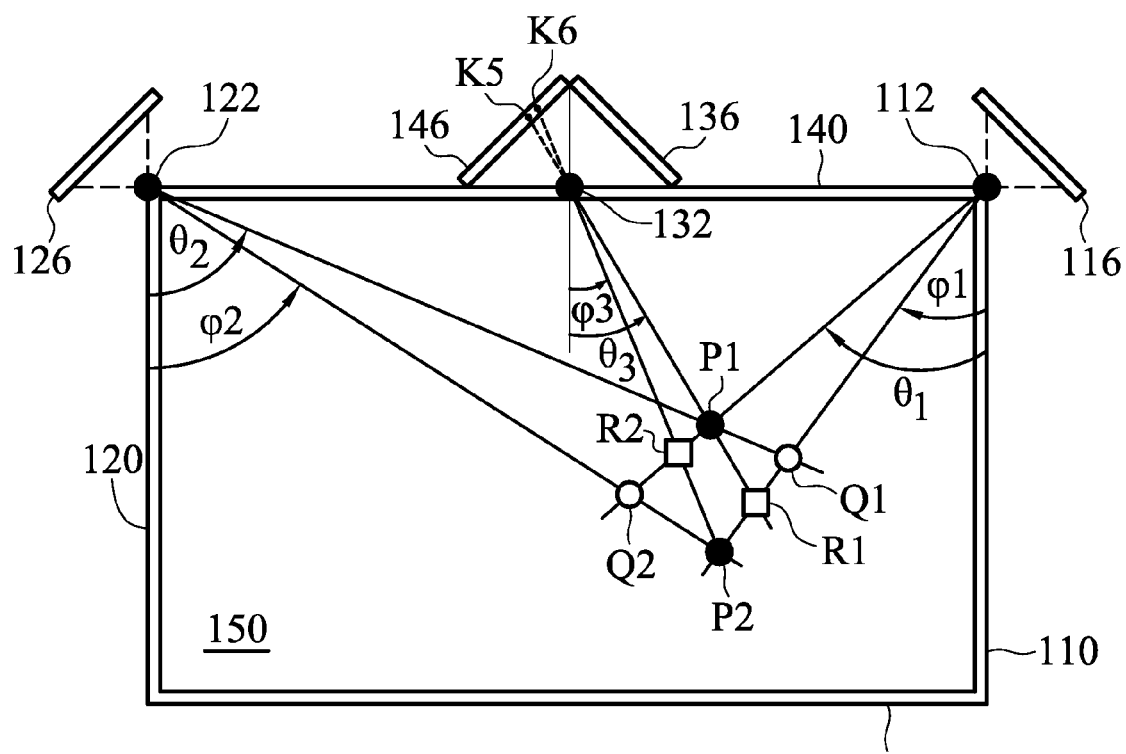

In some situations, the touch points P1 and P2 may possibly locate on the left half portion or right half portion. In this regard, the derivation remains the same without being affected by locations. For example, FIG. 4b is a diagram illustrating another embodiment of simultaneous detection of a first touch point P1 and a second touch point P2 according to the invention. It is assumed that two objects simultaneously touch the touch panel 150 on the first touch point P1 and the second touch point P2, the obstructed points K1 and K2 are projected on the first light sensor module 116 and the obstructed points K3 and K4 are projected on the second light sensor module 126. Specifically, the touch points P1 and P2 located on the right half portion of the touch panel 150 are both within the field of view of the right light sensor 146, thus forming the obstructed points K5 and K6 on the right light sensor 146. In this regard, the calculation unit 160 obtains the angles $\theta_1$, $\theta_2$, $\phi_1$, and $\phi_2$ respectively according to the obstructed points K1 and K2 on the first light sensor module 116 and the obstructed points K3 and K4 on the second light sensor module 126. Then, two sets of possible solutions (P1, P2) and (Q1, Q2) are obtained based on Formula (8), (9), (10), and (11). Additionally, the obstructed points K5 and K6 detected by the left light sensor 136 are replaced in Formula (1) to obtain two angles $\theta_3$ and $\phi_3$. Two lines respectively extended from the third pinhole 132 with respect to angles $\theta_3$ and $\phi_3$ intersect the two lines respectively extended from the first pinhole 112 with respect to angles $\theta_1$ and $\phi_1$ at four points P1, P2, R1 and R2, and the coordinates thereof are derived according to Formula (6):

$$P1(x,y)=F(\theta_1,\theta_3) \qquad (16),$$

$$P2(x,y)=F(\phi_1,\phi3) \qquad (17),$$

$$R1(x,y)=F(\theta_3,\phi_1) \qquad (18),$$

and $$R2(x,y)=F(\theta_1,\phi3) \qquad (19).$$

Based on four solutions of Formula (16) to Formula (19), two sets of possible solutions (P1, P2) and (R1, R2) are determined according to the obstructed points K5 and K6 on the right light sensor 146 and the obstructed points K1 and K2 on the first light sensor module 116. Next, comparing Formula (16), (17), (18), (19) with the former Formula (8), (9), (10), (11), it is determined that (P1, P2) is the intersection of the two sets of possible solutions. As such, (P1, P2) is determined to be the actual locations of touch points.

Similarly, several sets of possible solutions may be obtained by substituting angles $\theta_2$ and $\phi_2$ measured by the second light sensor module 126 and the angle $\phi_3$ measured on the right light sensor 146 into Formula (6). Comparing formulas (8), (9), (10), (11), the intersection, i.e., (P1, P2), is then determined. Furthermore, in some situations, coordinate candidates of the touch points outside the region of the touch panel 150 may be directly discarded to facilitate the determination of the actual coordinates of the touch points.

From the aforementioned description, the determination of multipoint touch is based on the simultaneous equations. The process of determining the locations of two touch points requires at least two simultaneous equations. It is sufficient for the first light sensor module 116 and the second light sensor module 126 to provide a first set of possible solutions. Further, a second set of possible solutions is provided by the left and right light sensor 136/146 and the first and second light sensor module 116/126. The intersection of the first set and the second set of possible solutions is provided as the solution of the simultaneous equations. Similarly, if there are more than N touch points on the touch panel 150, the location of each touch point is correspondingly determined by (N+1) pinholes with the same derivation and calculation process.

Figure 5:
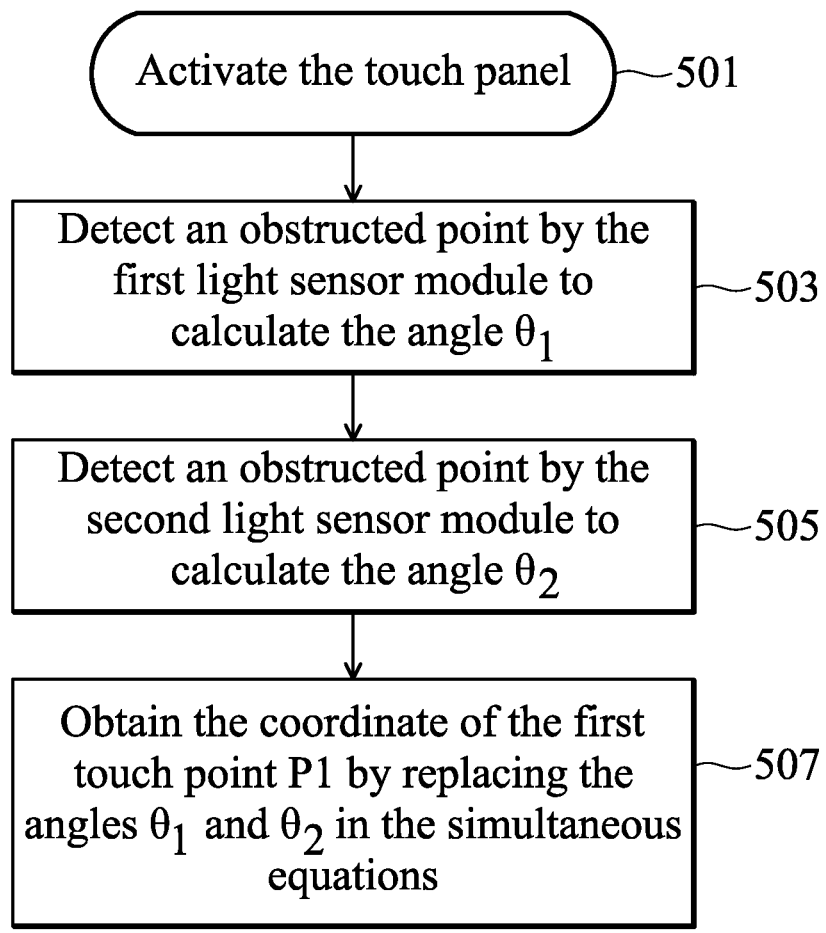
FIG. 5 is a flow diagram illustrating an embodiment of detecting a touch point according to the invention.

FIG. 5 is a flow diagram illustrating an embodiment of detecting a first touch point P1 according to the invention. The process of FIG. 2 may be simply represented as following steps. First, at step 501, the touch panel 150 as shown in FIG. 1 is activated. The first light source 114 and the second light source 124 emit light beams, and reflection lights of the first edge 110, the second edge 120, and the third edge 130 are projected on the first light sensor module 116 and the second light sensor module 126 through the first pinhole 112 and the second pinhole 122 based on pinhole projection. An object contacts the touch panel 150, and the touch point is the first touch point P1. At step 503, an obstructed point j1 is detected at t1 on the first light sensor module 116. An angle $\theta_1$ formed between a direction from the first touch point P1 to the first pinhole 112 and the first edge 110 is calculated according to Formula (1). Moreover, at step 505, an obstructed point j2 is detected at t2 on the second light sensor module 126, so as to calculate an angle $\theta_2$. Following this, at step 507, the angles $\theta_1$ and $\theta_2$ are replaced in the simultaneous equations depicted in Formula (4) and Formula (5), so as to obtain the coordinate of the first touch point P1.

Figure 6:
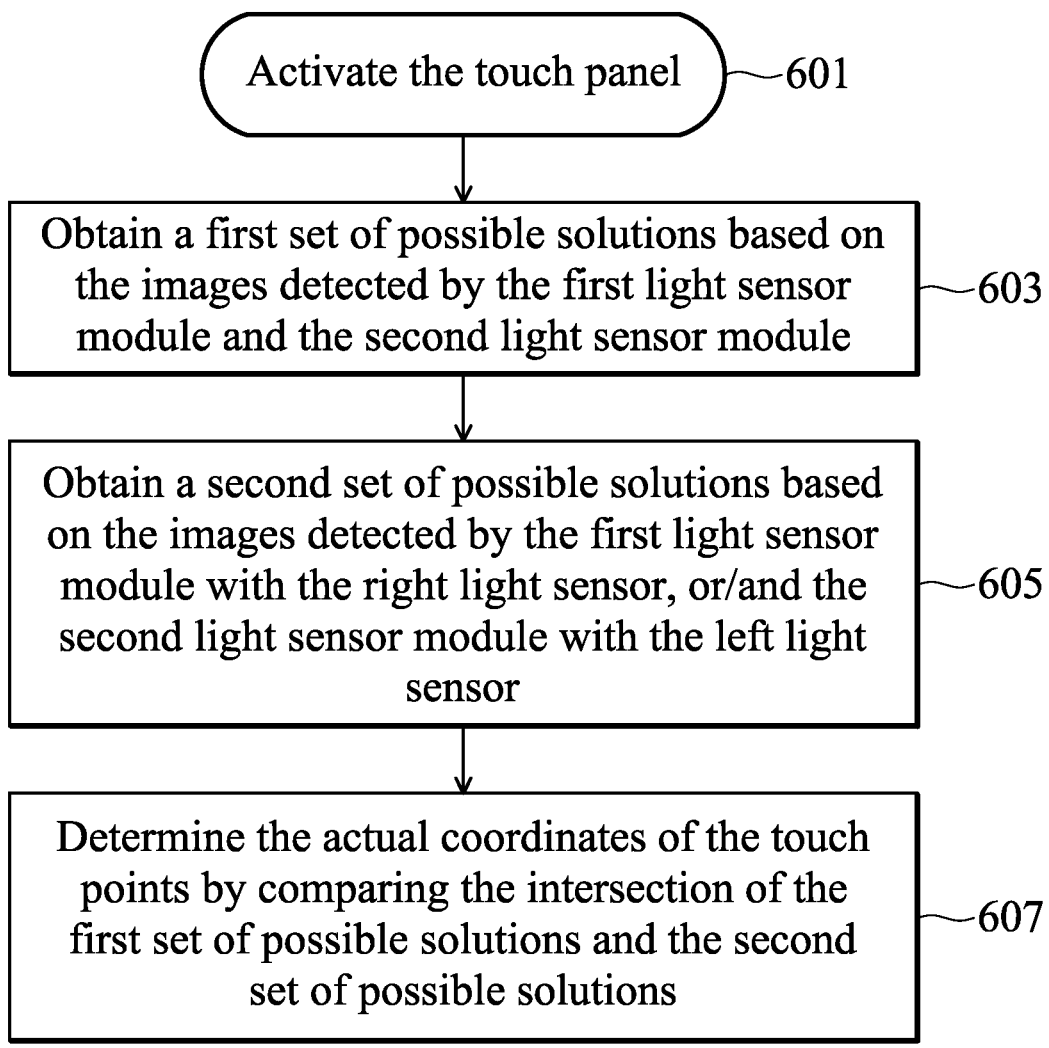
FIG. 6 is a flow diagram illustrating an embodiment of an embodiment of simultaneously detecting two touch points according to the invention.

FIG. 6 is a flow diagram illustrating an embodiment of an embodiment of simultaneous detection of a first touch point P1 and a second touch point P2 according to the invention. First, at step 601, the touch panel 150 as shown in FIG. 1 is activated for receiving multipoint contact. At step 603, a first set of possible solutions is obtained based on the images detected by the first light sensor module 116 and the second light sensor module 126, such as coordinate candidates as shown in Formula (8), (9), (10) and (11). At step 605, a second set of possible solutions is obtained based on the solution of the simultaneous equations associated with the images detected by the first/second light sensor module 116/126 and the left/right light sensor 136/146, such as coordinate candidates as shown in Formula (12), (13), (14) and (15). At step 607, upon comparing the intersection of the first set and the second set of possible solutions, the actual coordinates of the touch points are accordingly determined, such as the coordinates of the first touch point P1 and the second touch point P2 as shown in Formula (13) and Formula (15).

The touch detection apparatus 100 according to the embodiments of the invention may applicable to handheld mobile devices, large projection screens, touch panels, or tablets. The arrangement of the touch panel, edges and pinholes may depend on application requirements, so as to perform the height, width and location adjustment. For example, the first light source 114 and the second light source 124 may be disposed everywhere without affecting the pinholes to receive reflection lights.

The area of the touch panel 150 may be smaller than or equal to the rectangular area encircled by the first edge 110, the second edge 120, the third edge 130 and the fourth edge 140. The calculation unit 160 may consist of hardware circuits dedicated to analysis calculation of projected images, or a processor which could perform the calculation by executing operating systems and software.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A touch detection apparatus for detecting a location of a touch point touched by an object, comprising:
   a touch panel for receiving contact from at least one object;
   a first edge, a second edge, a third edge and a fourth edge for encircling the touch panel, wherein the first edge is opposite to the second edge and the third edge is opposite to the fourth edge, and the first edge, the second edge and the third edge comprise retro-reflection materials;
   a first pinhole and a first light source disposed on the corner of the first edge and the fourth edge for emitting a first light beam toward the second edge and the third edge to generate a first reflection light;
   a second pinhole and a second light source disposed on the corner of the second edge and the fourth edge for emitting a second light beam toward the first edge and the third edge to generate a second reflection light;
   a first light sensor module disposed at the outer edge of the touch panel and separated from the first pinhole by a predetermined distance for detecting a first image projected on the first light sensor module by the first reflection light through the first pinhole;
   a second light sensor module disposed at the outer edge of the touch panel and separated from the second pinhole by the predetermined distance for detecting a second image projected on the second light sensor module by the second reflection light through the second pinhole;
   a third pinhole disposed on the middle of the fourth edge;
   a third light sensor module disposed at the outer edge of the fourth edge towards the third pinhole for detecting a third image projected on the third light sensor module by the first reflection light and the second reflection light through the third pinhole, wherein the third light sensor module comprises a left light sensor and a right light sensor, and the left light sensor, the right light sensor and fourth edge form a closed area; and
   a calculation unit coupled to the first light sensor module, the second light sensor module and the third light sensor module for receiving the first image, the second image and the third image, to perform an image analysis to determine a coordinate of a touch point where the touch panel is contacted by the at least one object, wherein the third image is obstructed by the first object and the second object to generate two obstructed points thereon, and the calculation unit substitutes any two obstructed locations of the obstructed points on the first image and the third image into a angle formula and performs the conversion operation to obtain a second set of possible solutions which comprises four coordinate candidates of the touch points, and the calculation unit determines the coordinates of the touch points touched by the first object and the second object in the intersection of the first set of possible solutions and the second set of possible solutions.

2. The touch detection apparatus as claimed in claim 1, wherein the first light sensor module and the second light sensor module are characterized by a one-dimensional structure with the same length, and the first image and the second image are one-dimensional line images.

3. The touch detection apparatus as claimed in claim 2, wherein the first edge and the second edge have a first length, and the third edge and the fourth edge have a second length.

4. The touch detection apparatus as claimed in claim 3, wherein the first light source and the second light source are light emitting diodes, and the first light beam and the second light beam comprise at least a laser beam, an infrared ray, or a visible ray.

5. The touch detection apparatus as claimed in claim 3, wherein:
   when a first object touches the touch panel on a first touch point, the first reflection light is obstructed by the first object to generate a first obstructed point on the first image and the second reflection light is obstructed by the first object to generate a second obstructed point on the second image, and
   the calculation unit performs the image analysis process by calculating a first angle formed between a direction from the first object to the first pinhole and the first edge based on an obstructed location of the first obstructed point on the first image, and calculating a second angle formed between a direction from the first object to the second pinhole and the second angle based on an obstructed location of the second obstructed point on the second image.

6. The touch detection apparatus as claimed in claim 5, wherein the calculation unit performs the image analysis process to calculate the first angle and the second angle according to the following angle formula:

$$\tan\theta_1 = \frac{t_1/s}{1-t_1/s},$$

and $$\tan\theta_2 = \frac{t_2/s}{1-t_2/s},$$

wherein:
$\theta_1$ represents the first angle, $t_1$ represents the obstructed location of the first obstructed point on the first light sensor module,
$\theta_2$ represents the second angle, $t_2$ represents the obstructed location of the second obstructed point on the second light sensor module, and
S represents the length of the first light sensor module and the second light sensor module.

7. The touch detection apparatus as claimed in claim 6, wherein the calculation unit further performs the image analysis process to obtain a coordinate of the first touch point via a conversion operation based on the first angle, the second angle, the first length, and the second length.

8. The touch detection apparatus as claimed in claim 7, wherein the conversion operation is accomplished by using the following formula:

$$x = \frac{W\tan\theta_2}{(\tan\theta_1 + \tan\theta_2)}$$

and $$y = H - \frac{W}{(\tan\theta_1 + \tan\theta_2)},$$

wherein x represents the horizontal axis, y represents the vertical axis, W represents the first length, and H represents the second length.

9. The touch detection apparatus as claimed in claim 8, wherein:
when the first object and a second object touch the touch panel on different touch points, the first reflection light is obstructed by the first object and the second object to generate two obstructed points on the first image and the second reflection light is obstructed by the first object and the second object to generate two obstructed points on the second image, and
the calculation unit substitutes any two obstructed locations of the obstructed points on the first image and the second image into the angle formula and performs the conversion operation to obtain a first set of possible solutions which comprises four coordinate candidates of the touch points.

10. The touch detection apparatus as claimed in claim 1, wherein:
the left light sensor and the right light sensor have the same length and are disposed perpendicularly to each other on the fourth edge to form an isosceles triangle,
perpendicular bisectors of the left light sensor and the right light sensor are respectively towards the third pinhole, and
the third image comprises:
a left half image obtained by the left light sensor detecting the first reflection light of the second edge and the third edge; and
a right half image obtained by the right light sensor detecting the second reflection light of the first edge and the third edge.

11. The touch detection apparatus as claimed in claim 10, wherein:
the calculation unit substitutes the left half image and the second image into the angle formula and performs the conversion operation to obtain one part of the touch point candidates of the second set of possible solutions, and
the calculation unit substitutes the right half image and the second image into the angle formula and performs the conversion operation to obtain the other part of touch point candidates of the second set of possible solutions.

12. A touch point detection method for detecting a location of a touch point on a touch panel contacted by at least one object, the method comprises the following steps:
providing a first edge, a second edge, a third edge and a fourth edge for encircling the touch panel, wherein the first edge is opposite to the second edge and the third edge is opposite to the fourth edge, and the first edge, the second edge and the third edge comprise retro-reflection materials;
providing a first light beam toward the second edge and the third edge on the corner of the first edge and the fourth edge to generate a first reflection light;
providing a second light beam toward the first edge and the third edge on the corner of the second edge and the fourth edge to generate a second reflection light;
disposing a first pinhole on the corner of the first edge and the fourth edge, a second pinhole on the corner the second edge and the fourth edge and a third pinhole on the middle of the fourth edge;
disposing a first light sensor module at the outer edge of the touch panel and separated from the first pinhole by a predetermined distance for detecting a first image projected on the first light sensor module by the first reflection light through the first pinhole;
disposing a second light sensor module at the outer edge of the touch panel and separated from the second pinhole by the predetermined distance for detecting a second image projected on the second light sensor module by the second reflection light through the second pinhole;
disposing a third light sensor module at the outer edge of the fourth edge towards the third pinhole for detecting a third image projected on the third light sensor module by the first reflection light and the second reflection light through the third pinhole, wherein the third light sensor module comprises a left light sensor and a right light sensor, and the left light sensor, the right light sensor and fourth edge form a closed area,
wherein an image analysis process is performed according to the first image, the second image and the third image to determine a coordinate of a touch point where the touch panel is contacted by the at least one object;
wherein when the first object and a second object touch the touch panel on different touch points, the first reflection light is obstructed by the first object and the second object to generate two obstructed points on the first image and the second reflection light is obstructed by the first object and the second object to generate two obstructed points on the second image, and the third image is obstructed by the first object and the second object to generate two obstructed points thereon;
wherein the image analysis process further comprises the steps of:
substituting any two obstructed locations of the obstructed points on the first image and the second image respectively from the first object and the second object into the angle formula and perform the conversion function to obtain a first set of possible solutions which comprises four coordinate candidates of the touch points;

substituting any two obstructed locations of the obstructed points on the first image and the third image respectively from the first object and the second object into the angle formula and perform the conversion function to obtain a second set of possible solutions which comprises four coordinate candidates of the touch points; and determining the coordinates of the touch points touched by the first object and the second object in the intersection of the first set of possible solutions and the second set of possible solutions.

13. The touch point detection method as claimed in claim 12, wherein:

the first light sensor module and the second light sensor module are characterized by a one-dimensional structure with the same length, and the first image and the second image are one-dimensional line images, the first edge and the second edge have a first length, and the third edge and the fourth edge have a second length.

14. The touch point detection method as claimed in claim 13, wherein the step of providing the first light beam and the second light beam comprises the step of:

utilizing light emitting diodes to emit an infrared ray or a visible ray.

15. The touch point detection method as claimed in claim 13, wherein:

when a first object touches the touch panel on a first touch point, the first reflection light is obstructed by the first object to generate a first obstructed point on the first image and the second reflection light is obstructed by the first object to generate a second obstructed point on the second image, and the image analysis process comprises the steps of:

calculating a first angle θ1 formed between a direction from the first object to the first pinhole and the first edge based on an obstructed location of the first obstructed point on the first image; and calculating a second angle θ2 formed between a direction from the first object to the second pinhole and the second edge based on an obstructed location of the second obstructed point on the second image.

16. The touch point detection method as claimed in claim 15, wherein the image analysis process further comprises the step of:

substituting the obstructed location of the first obstructed point on the first light sensor module and the obstructed location of the second obstructed point on the second light sensor module to calculate the first angle and the second angle according to the following angle formula:

$$\tan\theta = \frac{t/s}{1-t/s},$$

wherein θ represents the first angle when the obstructed location of the first obstructed point on the first light sensor module is taken into t, θ represents the second angle when the obstructed location of the second obstructed point on the second light sensor module is taken into t, and S represents the length of the first light sensor module and the second light sensor module.

17. The touch point detection method as claimed in claim 16, wherein the image analysis process further comprises the step of:

obtaining a coordinate of the first touch point via a conversion function based on the first angle, the second angle, the first length, and the second length, and the conversion function is represented as:

$$x = \frac{W\tan\theta_2}{(\tan\theta_1 + \tan\theta_2)}$$

and $$y = H - \frac{W}{(\tan\theta_1 + \tan\theta_2)},$$

wherein x represents the horizontal axis, y represents the vertical axis, W represents the first length, and H represents the second length.

18. The touch point detection method as claimed in claim 12, wherein:

the left light sensor and the right light sensor with the same length that are disposed perpendicularly to each other on the fourth edge to form an isosceles triangle, perpendicular bisectors of the left light sensor and the right light sensor are respectively towards the third pinhole, and the image analysis process further comprises the steps of:

obtaining a left half image of the third image by the left light sensor detecting the first reflection light of the second edge and the third edge; and obtaining a right half image of the third image by the right light sensor detecting the second reflection light of the first edge and the third edge.

19. The touch point detection method as claimed in claim 18, further comprising the steps of:

taking the left half image and the second image into the said angle equation and the conversion equation so as to obtain one part of the touch point candidates of the second set of possible solutions; and taking the right half image and the second image into the said angle equation and the conversion equation so as to obtain the other part of touch point candidates of the second set of possible solutions.

20. A touch detection apparatus for detecting a location of a touch point touched by an object on a touch panel encircled by a first edge, a second edge, a third edge and a fourth edge, comprising:

a first pinhole and a first light source disposed on the corner of the first edge and the fourth edge for emitting a first light beam toward the second edge and the third edge to generate a first reflection light;

a second pinhole and a second light source disposed on the corner of the second edge and the fourth edge for emitting a second light beam toward the first edge and the third edge to generate a second reflection light;

a third pinhole disposed on the middle of the fourth edge;

a first light sensor module to detect a first image through the first pinhole;

a second light sensor module to detect a second image through the second pinhole;

a third light sensor module comprising a left light sensor and a right light sensor to detect a third image through the third pinhole, wherein the left light sensor, the right light sensor and fourth edge form a closed area; and a calculation unit to determine a coordinate of the touch point according to the first image, the second image and the third image, wherein the third image is obstructed by the first object and the second object to generate two obstructed points thereon, and the calculation unit substitutes any two obstructed locations of the obstructed points on the first image and the third image into a angle formula and performs the conversion operation to obtain a second set of possible solutions which comprises four coordinate candidates of the touch points, and the calculation unit determines the coordinates of the touch points touched by the first object and the second object in the intersection of the first set of possible solutions and the second set of possible solutions.

* * * * *